United States Patent

Otsuki et al.

[11] Patent Number: 5,815,401
[45] Date of Patent: Sep. 29, 1998

[54] FREE-FORM CURVE INTERPOLATION METHOD AND APPARATUS

[75] Inventors: Toshiaki Otsuki, Minamitsuru-gun; Haruhiko Kozai; Yoshiyuki Wakinotani, both of Oshino-mura, all of Japan

[73] Assignee: Fanuc Ltd., Yamanashi, Japan

[21] Appl. No.: 765,754

[22] PCT Filed: May 9, 1996

[86] PCT No.: PCT/JP96/01228

§ 371 Date: Dec. 23, 1996

§ 102(e) Date: Dec. 23, 1996

[87] PCT Pub. No.: WO96/35980

PCT Pub. Date: Nov. 14, 1996

[30] Foreign Application Priority Data

May 9, 1995 [JP] Japan ................................ 7-110673

[51] Int. Cl.⁶ .................................................. G05B 19/4099
[52] U.S. Cl. ................................ 364/474.31; 364/474.24
[58] Field of Search .......................... 364/474.24, 474.31, 364/474.29, 474.05, 468.03, 468.04, 468.25; 345/419, 420, 441; 318/573

[56] References Cited

U.S. PATENT DOCUMENTS

| | | | |
|---|---|---|---|
| 5,227,978 | 7/1993 | Kato | 364/474.31 |
| 5,282,143 | 1/1994 | Shirai et al. | 364/474.24 X |
| 5,453,934 | 9/1995 | Taghavi et al. | 364/474.24 |
| 5,510,995 | 4/1996 | Oliver | 364/474.24 |
| 5,581,672 | 12/1996 | Letcher, Jr. | 364/474.24 |

FOREIGN PATENT DOCUMENTS

| | | |
|---|---|---|
| 41 36 843 A | 5/1992 | Germany . |
| 43 10 126 A | 10/1994 | Germany . |
| 63-106011 | 5/1988 | Japan . |

OTHER PUBLICATIONS

IEEE Computer Graphics and Applications, vol. 11, No. 1, Jan. 1991, pp. 55–71.

*Primary Examiner*—Joseph Ruggiero
*Attorney, Agent, or Firm*—Staas & Halsey

[57] ABSTRACT

A free-form curve interpolation method and device is provided for smoothly interconnecting curves using a non-uniform rational B-spline (NURBS) curve representation. This ability to interconnect free-form curves is important when machine parts of small dimensions or complex configuration. This is accomplished by a preprocessing calculation unit reads NC programs including an interpolation command of a NURBS curve expressed by a function using a parameter t as a variable, and calculates a distance $\Delta L$ to move during an interpolation period T. A parameter change calculation unit calculates a change $\Delta t$ in the parameter t brought on when moving by the distance $\Delta L$, on the basis of a current position specified by a current value $t_i$ of the parameter t. A movement amount calculation unit calculates a position when the value of parameter t is $t_i + \Delta t$, by a defining formula of the NURBS curve. Subsequently, the movement calculation unit calculates a movement amount of each axis for amoving to the calculated position, and outputs an interpolation pulse to each axis.

5 Claims, 7 Drawing Sheets

FREE-FORM CURVE INTERPOLATION METHOD AND APPARATUS

TECHNICAL FIELD

The present invention relates to a free-form curve interpolation method for a numerical control unit, and in particular, to a free-form curve interpolation method of a curve represented by a NURBS (Non-Uniform Rational B-Spline).

DESCRIPTION OF THE RELATED ART

In order to machine a workpiece with machine tools, NC programs executed by to a computer numerical control (CNC) unit are in many instances created by automatic programming function based on a form drawn by a CAD (Computer Aided Design), system etc. In this case, one who designs a profile of workpiece can freely draw various curves using a various functions of a CAD system.

However, it is difficult to smoothly connect free-form curves expressing complicated profiles with one another. To deal with this, a free-form curve is divided into relatively simple intervals called segments, in order to represent the curve. There is a Base Spline curve as one of the functions for defining the free-form curve, and it is commonly called a B-Spline curve. The B-Spline curve can be defined by a plurality of control vectors. Moreover, a parameter corresponding to a junction between segments of B-Spline curve is called a knot. The value of the knot gradually increases from the start point toward the end point of the B-Spline curve.

Then, the B-Spline curve which is nonuniform in the increase rate of knot is rationalized, and a curve thus obtained is called a NURBS (Non-Uniform Rational B-Spline) curve.

In the CAD system for a design of industrial products, etc., it is becoming popular to represent profiles of a curve and a curved surface with NURBS. This NURBS curve is adopted, as a form representing a free-form curve, in a standard of CAD data exchange, i.e., an IGES (Initial Graphics Data Exchange Specification).

On the other hand, in interpolating the free-form curve using a conventional CNC, it is necessary to do so by combining small blocks such as small straight lines, small circular arcs, etc. Therefore, in general, CAD data represented by the NURBS curve is approximated to small straight lines, small circular arcs of the free-form curve designed by the CAD system in the stage before the CNC unit prepares command formats.

However, as movement command blocks for the purpose of improving machining accuracy of industrial products are made smaller, various problems have arisen. For example, there are problems such as delay of command program transmission speed between a host computer and a CNC unit due to influence caused by the large number and size of command blocks, and a delay of command program analysis processing speed of the CNC unit, etc. As described above, the NURBS curve drawn by the CAD system has to be decomposed into smaller blocks in order to be processed by the numerical control unit for interpolation of NURBS curve by the numerical control unit. For this reason, complicate processing is required, thereby causing the problem of long execution time.

SUMMARY OF THE INVENTION

An object of the present invention is to provide a free-form curve interpolation method and an apparatus thereof for a numerical control unit, which is capable of performing an interpolation of a NURBS curve by commanding data for specifying the NURBS curve directly to the numerical control unit.

A free-form curve interpolation method according to the present invention repeats a series of following processings:
  first, recognizing a NURBS curve interpolation command included in NC programs;
  calculating a distance to move during an interpolation period used as unit period, on the basis of a feed rate command in the recognized interpolation command;
  calculating a change in a parameter brought on when moving by the calculated distance from a current position specified by a current value of the parameter;
  calculating a position to be specified by the parameter as the sum of the calculated change of the parameter and the current parameter, based on the defining formula of the aforesaid NURBS curve;
  calculating a movement amount of each axis for moving to the calculated position; and
  outputting an interpolation pulse to each axis.

A free-form curve interpolation apparatus according to the present invention comprises:
  preprocessing calculation means for reading NC programs including an interpolation command of a NURBS curve expressed by a function using a specific parameter as a variable, and calculating movement amount per unit time on the basis of a feed rate command in the interpolation command of the NURBS curve, thus outputting a movement command;
  parameter change calculation means for calculating a change in the parameter brought on when moving by the movement amount; and
  movement calculation means for obtaining a coordinate value to be interpolated next by substituting a value, as the sum of the change rate and a current value of the parameter, for the function of the NURBS curve, in order to calculate movement amount of each axis.

In the present invention, the CNC is set so that it calculates a function of the NURBS curve on the basis of data given to the CNC to obtain an interpolation path. Therefore, a programmer can give a command for the NURBS curve drawn by the CAD or the like directly to the CNC, so that the interpolation of the NURBS curve can be executed in the CNC. As a result, NC programs can be simplified, so that program transmission and program analysis processing can be performed at a high speed, and machining accuracy can be improved as well.

DESCRIPTION OF THE PREFERRED EMBODIMENTS

Figure 1:
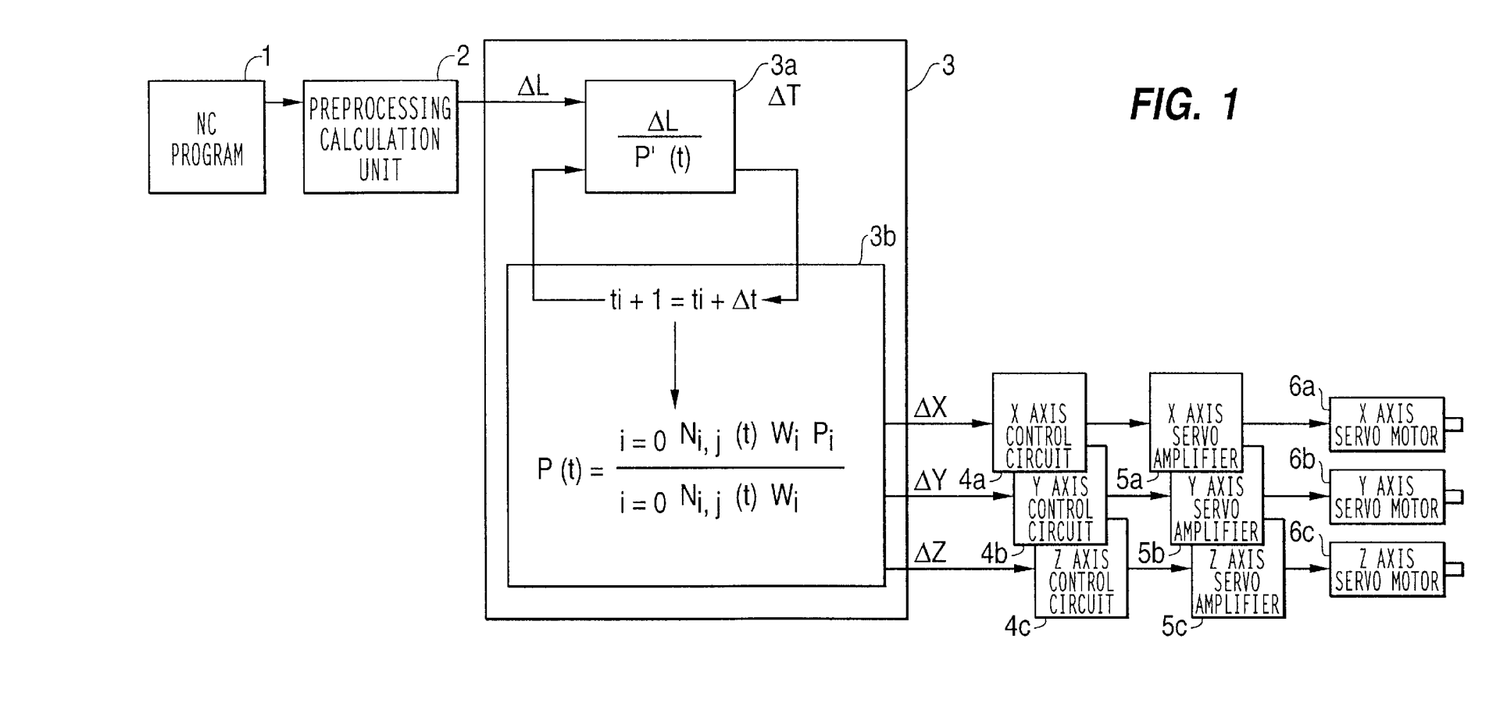
FIG. 1 is a block diagram schematically showing a construction of the present invention.

FIG. 1 is a block diagram schematically showing a construction of the present invention. There is prepared an NC program 1 including an interpolation command of a NURBS (Non-Uniform Rational B-Spline) curve. The profile of the NURBS curve is specified by data such as weight, and expressed by a function using a parameter "t" as a variable. Thus, if the value of parameter "t" at any time is determined, the coordinate value at that time is specified by a defining formula of the NURBS curve.

A preprocessing calculation unit 2 reads the NC program 1. Recognizing an interpolation command of the NURBS curve, the preprocessing calculation unit 2 calculates a distance $\Delta L$ to move during an interpolation period used as a unit period, on the basis of a feed rate command in the interpolation command. The distance $\Delta L$, together with other data for creating a function of the NURBS curve, is inputted to an interpolation unit 3.

The interpolation unit 3 comprises parameter change calculation unit 3a and movement calculation unit 3b. The parameter change calculation unit 3a calculates a change $\Delta t$ in the parameter "t" brought on when moving by the distance $\Delta L$ from the current position specified by the current value "$t_i$" of the parameter "t".

The movement calculation unit 3b calculates a position at which the value of parameter "t" becomes "$t_i+\Delta t$" by the defining formula of the NURBS curve.

Subsequently, the movement calculation unit 3b calculates a movement amount of each axis for moving to the position, and outputs interpolation pulses $\Delta X$, $\Delta Y$ and $\Delta Z$ corresponding to respective axes. Then, the value of "$t_i+\Delta t$" is transmitted to the parameter change calculation unit 3a as a value of "$t_i+1$"

Interpolation pulses $\Delta X$, $\Delta Y$ and $\Delta Z$ are individually input to each of corresponding axis control circuits 4a, 4b and 4c. The axis control circuits 4a, 4b and 4c respectively outputs a movement command to each of corresponding servo amplifiers 5a, 5b and 5c, whereupon servo amplifiers 5a, 5b and 5c respectively control rotation of each of the servo motors 6a, 6b and 6c according to the movement command.

In the manner as described above, data for specifying the NURBS curve drawn by the CAD system or the like is transmitted directly to the CNC, so that a free-form curve interpolation of the NURBS curve can be executed.

Next, detailed descriptions on the NURBS curve will be given. In order to indicate that a symbol shown in a numerical equation is a vector, the symbol is surrounded with angle brackets "< >"

The NURBS curve of rank "j" (j−1 degrees) is defined by the following equation (1):

$$<P(t)> = \frac{\sum_{i=0}^{n} N_{i,j}(t) \cdot w_i <P_i>}{\sum_{i=0}^{n} N_{i,j}(t) \cdot w_i} \quad (1)$$

As seen from the above explanation, the NURBS curve is a function using the parameter "t" as a variable, and is represented by a vector <P(t)>. Also, a basic function N is expressed by the following equations. For example, 1 rank basic function $N_{i,1}(t)$ is expressed as follows:

$$N_{i,1}(t) = \begin{cases} 1 (x_i \leq t < x_{i+1}) \\ 0 (t < x_i, x_{i+1} \leq t) \end{cases} \quad (2)$$

Also, k rank basic function $N_{i,k}(t)$ is expressed as follows:

$$N_{i,k}(t) = \frac{(t-x_i)N_{i,k-1}(t)}{x_{i+k-1}-x_i} + \frac{(x_{i+k}-t)N_{i+1,k-1}(t)}{x_{i+k}-x_{i+1}} \quad (3)$$

In the above equations (1) to (3), <$P_i$> is a control point vector ($0 \leq i \leq n$), and represents a control point inputted according to NC programs. Wi is weight ($0 \leq i \leq n$); on the other hand, $X_i$ is knot ($X_i \leq X_{i+1}$). A sequence [$X_0$, $X_1$, $X_2$, ... $X_m$] is a knot vector. In this case, the following relational equation is established, that is, "control point (n+1)+rank(j) =number of knot(m +1) ".

Figure 2:
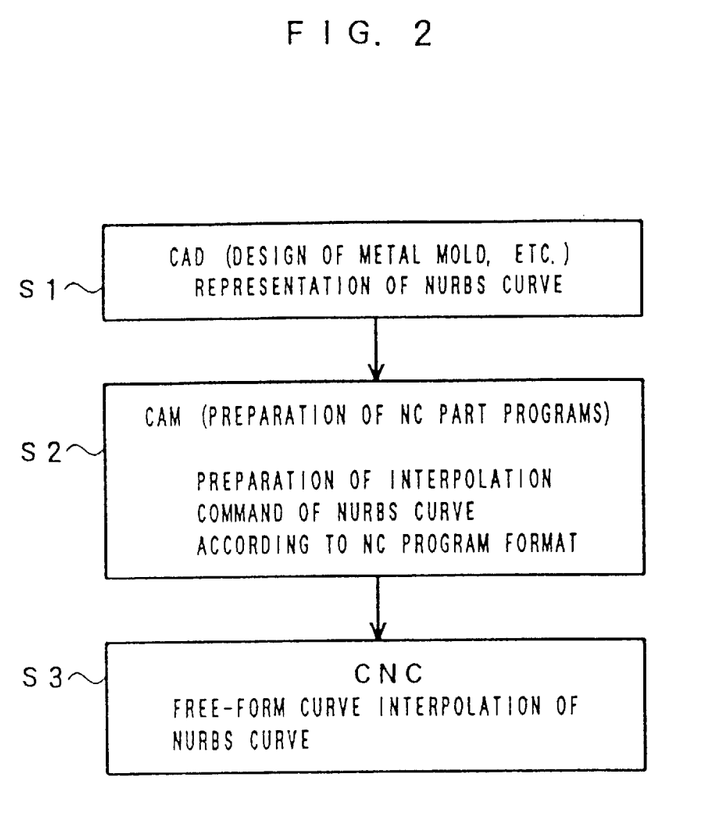
FIG. 2 is a flowchart showing a process for designing profile having a NURBS curve by a CAD system and for executing the profile machining with a machine tool.

FIG. 2 shows a process for designing a profile of the NURBS curve by the CAD system and for executing profile machining with the machine tool. More specifically, first, a design of molds, etc., are made by the CAD function (Step S1). In this case, a free-form curve is represented on the basis of the NURBS curve. Next, NC part programs are prepared by the function of CAM (Step S2). In this case, the CNC converts the NURBS curve into a predetermined NC program format, and prepares a NURBS curve interpolation command. Subsequently, the CNC executes NC programs including the NURBS curve interpolation command so that machine tool can machine workpieces such as molds, etc. (Step S3).

Figure 3:
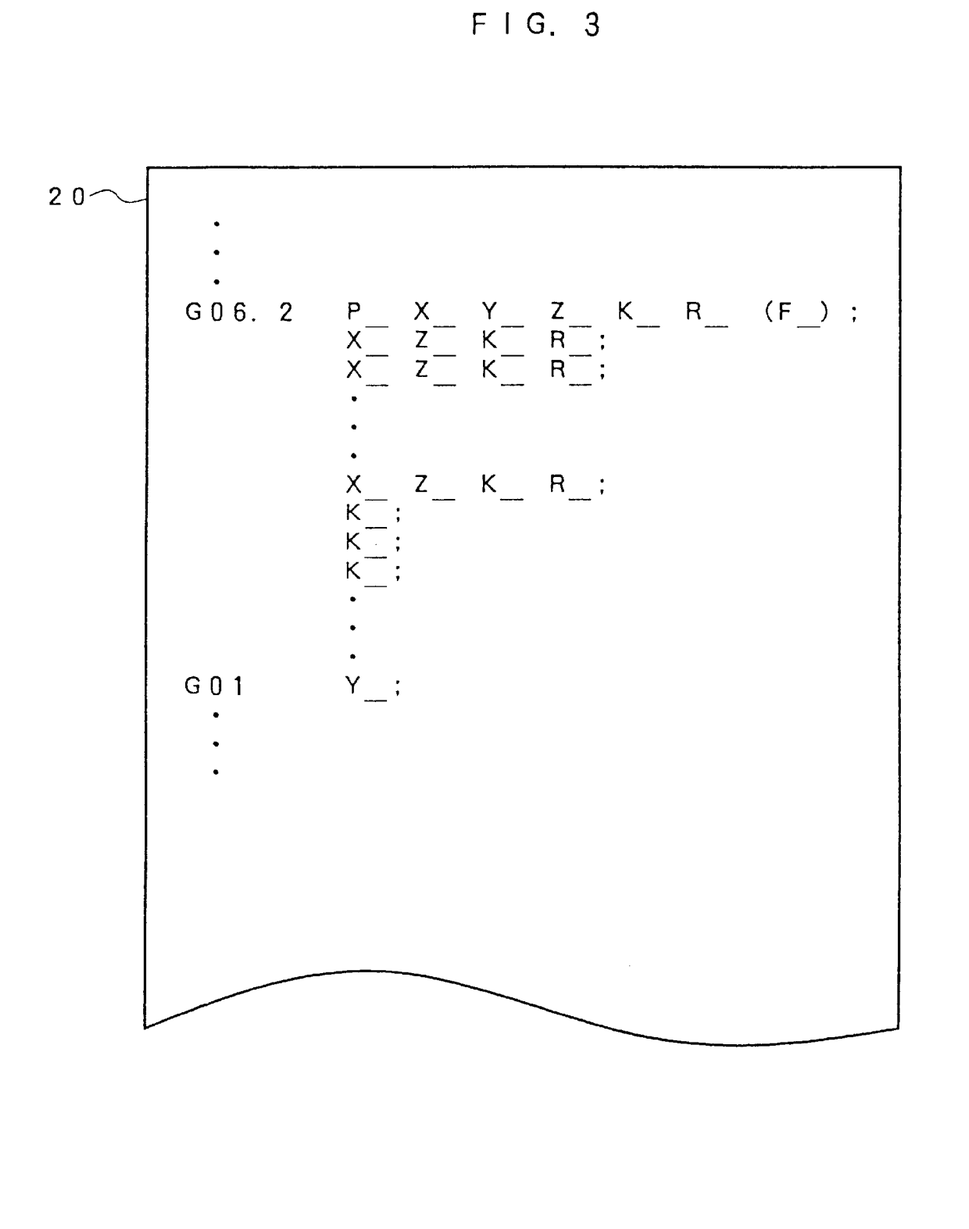
FIG. 3 is a diagram showing an example of a command format of the NURBS curve.

FIG. 3 shows an example of a NURBS curve command format. An NC program 20 is prepared on the basis of the format as shown in FIG. 3, whereby the NURBS curve interpolation is commanded to the CNC.

In this example, "G06.2" denotes a NURBS curve interpolation start command, "P" denotes rank, each of "X", "Y" and "Z" denotes a control point, "K" denotes knot, "R" denotes weight, "F" denotes velocity and "G01" denotes a linear interpolation command. "j", "$X_i$" and "$W_i$" in the above equations (1), (2) and (3) are given as values of these "P", "K" and "R", respectively. In order to specify the NURBS curve, there is a need of knot which in number is equivalent to the sum of the number of ranks and the number of control points. For this reason, in this example, when commanding a control point, knot is simultaneously commanded, and further, knot equivalent to the number of rank is commanded in another block. If weight is not commanded, the value of weight is regarded as "1". The NURBS curve interpolation command is canceled by other interpolation start command such as linear interpolation start command (G01), etc.

When the NC program as described above is input to the CNC, the NURBS interpolation start command is recognized by the preprocessing calculation means included in the CNC. A distance $\Delta L$ to move during interpolation period is calculated on the basis of a feed rate "F". Subsequently, a change $\Delta t$ in the current parameter "t" for moving by the distance $\Delta L$ is obtained from the following equation (4) on the basis of the distance $\Delta L$.

$$\Delta t = \frac{\Delta L}{|<P'(t)>|} \quad (4)$$

In the above equation (4), a denominator $|<'(t)>|$ is an absolute value obtained by differentiating the vector <P(t) > by the parameter "t".

A value of the vector P (t+$\Delta t$) obtained by substituting for the above equation (1) a sum of a parameter change $\Delta t$ obtained from the above equation (4) and a value of current parameter "t" is the next interpolation point.

Figure 4:
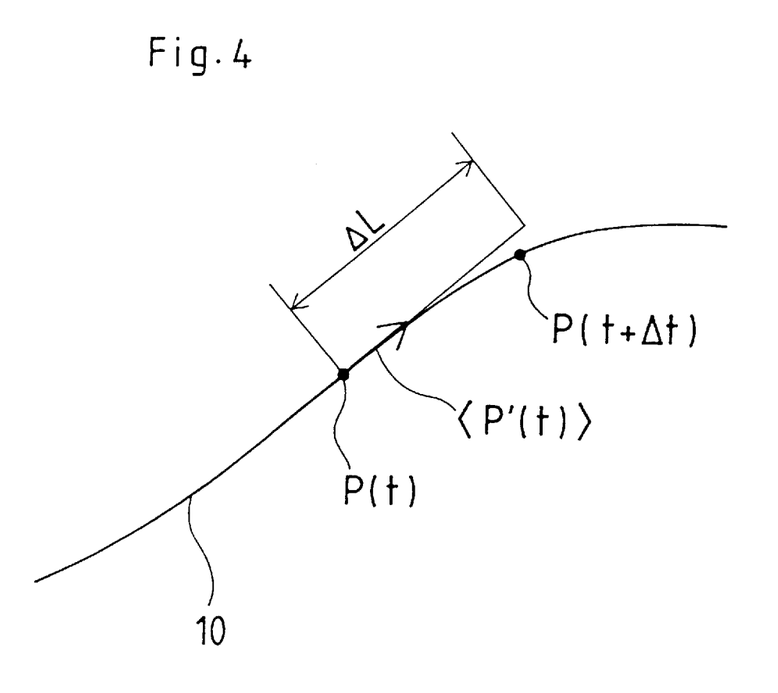
FIG. 4 is a diagram showing a movement amount in an interpolation period.

FIG. 4 is a diagram showing a movement amount during interpolation period. In FIG. 4, the current position P(t) on a commanded NURBS curve 10 is a point represented by a vector <P(t)>. Differentiating the vector <P(t)> by the parameter "t", a vector <P'(t)> is obtained. Thus, a point on the NURBS curve 10 separated from the vector <P'(t)> by the distance ΔL is a point P (t+Δt) represented by the vector <P(t)>.

Then, the movement calculation means 3b (shown in FIG. 1) calculates a movement amount of each axis from the point <P(t)> to the point P (t+Δt), and outputs interpolation pulse to each axis, whereby interpolation can be executed on a path along the NURBS curve 10.

The following is the detailed description of the case where a fourth rank (3rd order) NURBS curve interpolation is executed.

Figure 5:
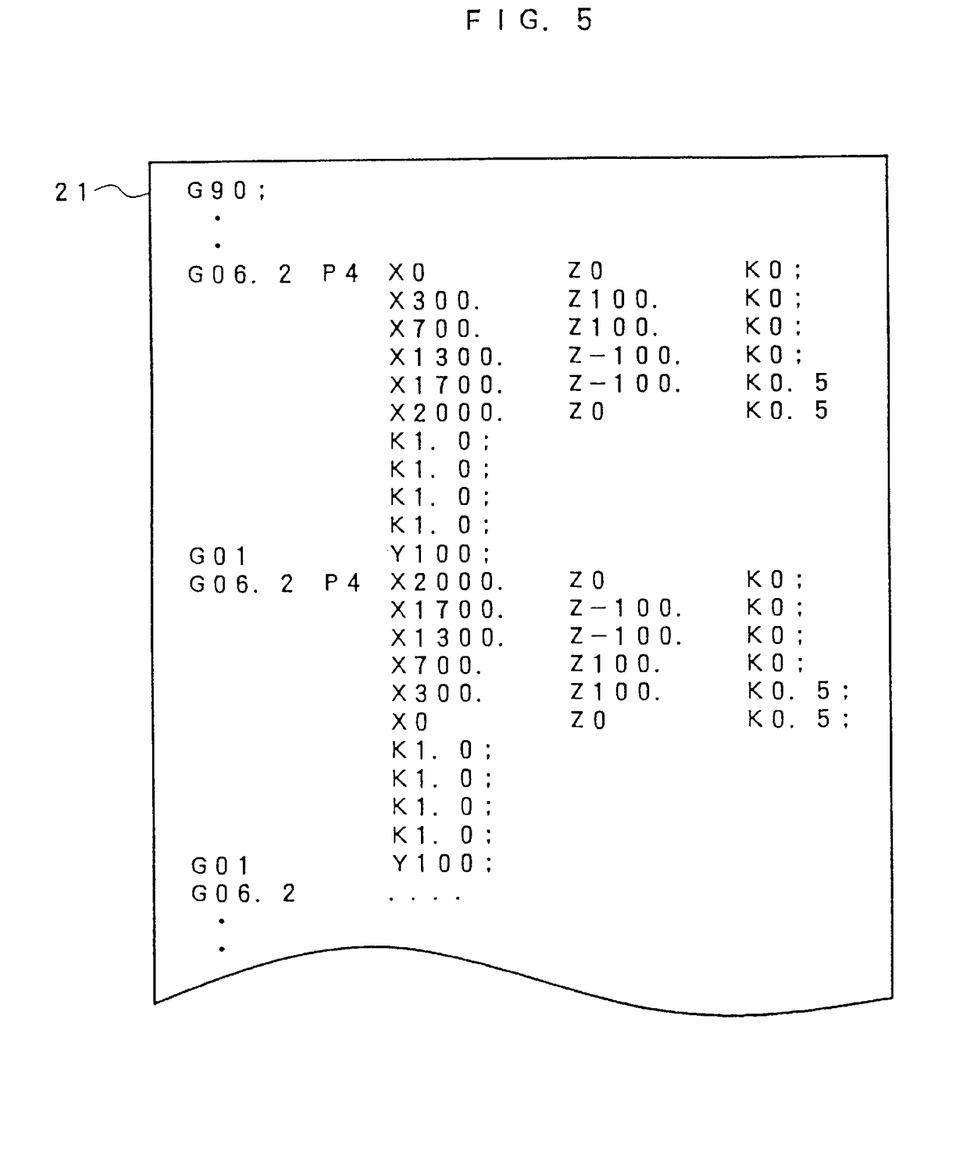
FIG. 5 is a diagram showing an example of NC program for executing the interpolation of NURBS curve.

FIG. 5 is a diagram showing an example of NC programs for executing the NURBS curve interpolation. In an NC program 21, a NURBS curve interpolation start command (G06.2) designates six control points. The coordinate of the first control point is (X0, Z0), the coordinate of the second control point is (X300, Z100.), the coordinate of the third control point is (X700, Z100.), the coordinate of the fourth control point is (X1300, Z−100.), the coordinate of the fifth control point is (X1700, Z−100.), and the coordinate of the sixth control point is (X2000, Z0). On the other hand, the knot is designated in the following named order, "0", "0", "0", "0", "0.5", "0.5", "1.0", "1.0", "1.0" and "1.0".

Subsequently, the NURBS curve interpolation start command (G06.2) is given after linear interpolation command (G01, Y100.). At this time, six control points are designated. The coordinate of the seventh control point is (X2000, Z0), the coordinate of the eighth control point is (X1700, Z−100.), the coordinate of the ninth control point is (X1300, Z−100.), the coordinate of the tenth control point is (X700, Z100.), the coordinate of the eleventh control point is (X300, Z100.), and the coordinate of the twelfth control point is (X0, Z0). On the other hand, the knot is designated in the following named order, "0", "0", " ", "0", "0.5", "0.5", "1.0", "1.0", "1.0" and "1.0".

The NURBS curve interpolation start command is cancelled by linear interpolation command (G01, Y100).

In the example case shown in FIG. 5, "j" is 4, and "n" is 5; therefore, the denominator and fraction of the vector <P(t)> defining the NURBS curve are expressed as follows on the basis of the equation (1).

[Fraction]:

$$N_{0.4}(t)<P_0>+N_{1.4}(t)<P_1>+N_{2.4}(t)<P_2>\ldots N_{5.4}(t)<P_5>$$

[Denominator]:

$$N_{0.4}(t)+N_{1.4}(t)+N_{2.4}(t)\ldots N_{5.4}(t)$$

In this case, it is commonly known that the value of denominator becomes "1" because Wi is always "1".

Therefore, the vector <P(t)> is expressed by the following equation (5).

$$<P(t)>=N_{0.4}(t)<P_0>+N_{1.4}(t)<P_1>+N_{2.4}(t)<P_2>\ldots N_{5.4}(t)<P_5> \quad (5)$$

where, $X_0 \leq t < X_9$.
Also, in FIG. 5,
$X_0=0.0$, $X_1=0.0$, $X_2=0.0$, $X_3=0.0$,
$X_4=0.5$, $X_5=0.5$, $X_6=1.0$, $X_7=1.0$,
$X_8=1.0$, $X_9=1.0$ Although the parameter "t" changes in the interval $X_0 \leq t < X_9$, the intervals where the parameter actually change are $X_3 \leq t < X_4$ and $X_5 \leq t < X_6$.

In the interval $0=X_3 \leq t < X_4=0.5$, calculating first rank basic function on the basis of the equation (2), we obtain
$N_{0.1}=0$, $N_{1.1}=0$, $N_{2.1}=0$, $N_{3.1}=1$,
$N_{4.1}=0$, $N_{5.1}=0$, $N_{6.1}=0$, $N_{7.1}=0$,
$N_{8.1}=0$ Substituting the above data for the equation (3) and calculating cases of k=2 and k=3 in the equation (3) in order, values of $N_{0.4}(t)$, $N_{1.4}(t)$, $N_{2.4}(t)$ ... $N_{5.4}(t)$ in the above equation (5) can be obtained (in the calculation of the equation (3), when the denominator of the first or second term in the right side of the equation become zero "0", the fraction thereof inevitably become zero "0"; in this case, the calculation is made as 0/0=0).

Specifically, $$N_{0.4}(t)=-8t^3+12t^2-6t+1$$

$$N_{1.4}(t)=24t^3-24t^2+6t$$

$$N_{2.4}(t)=-20t^3+12t^2$$

$$N_{3.4}(t)=4t^3$$

$$N_{4.4}(t)=0$$

$$N_{5.4}(t)=0$$

In the interval $X_3 \leq t < X_4$, the initial value t=0 is set, and |<P'(0)>| is calculated, and then, $\Delta t_1$ is obtained from the equation (4).

Whereupon, from the equation (5), the vector of the interpolation point <P(t+Δt$_1$)>=<P(Δt$_1$)> is as follows:

$$<P(\Delta t_1)>=N_{0.4}(\Delta t_1)<P_0>+N_{1.4}(\Delta t_1)<P_1>+N_{2.4}(\Delta t_1)<P_2>\ldots N_{5.4}(\Delta t_1)<P_5>$$

From the interpolation point thus obtained, |<P'(Δt$_1$)>| is calculated, and Δt$_2$ is calculated from the equation (4), in order to obtain a vector <P(t+Δt$_1$+Δt$_2$)>=<P(Δt$_1$+Δt$_2$)> which is the vector of a new interpolation point.

Likewise, if interpolation points are successively calculated, from the equation (5), these interpolation points are as follows:

<P(0)> (initial value)

<P(Δt$_1$)>;

<P(Δt$_1$+Δt$_2$)>;

<P(Δt$_1$+Δt$_2$+Δt$_3$)>;

.

.

.

<P(Δt$_1$+Δt$_2$+Δt$_3$. . . . . . +Δt$_i$)>.

In this case, if the value of Δt$_1$+Δt$_2$+Δt$_3$. . . . . . +Δt$_i$ exceeds 0.5, P(0.5) is set.

Also, vectors in the case of the interval $X_5 \leq t < X_6$ can be calculated in the same manner as the aforesaid interval.

Figure 6:
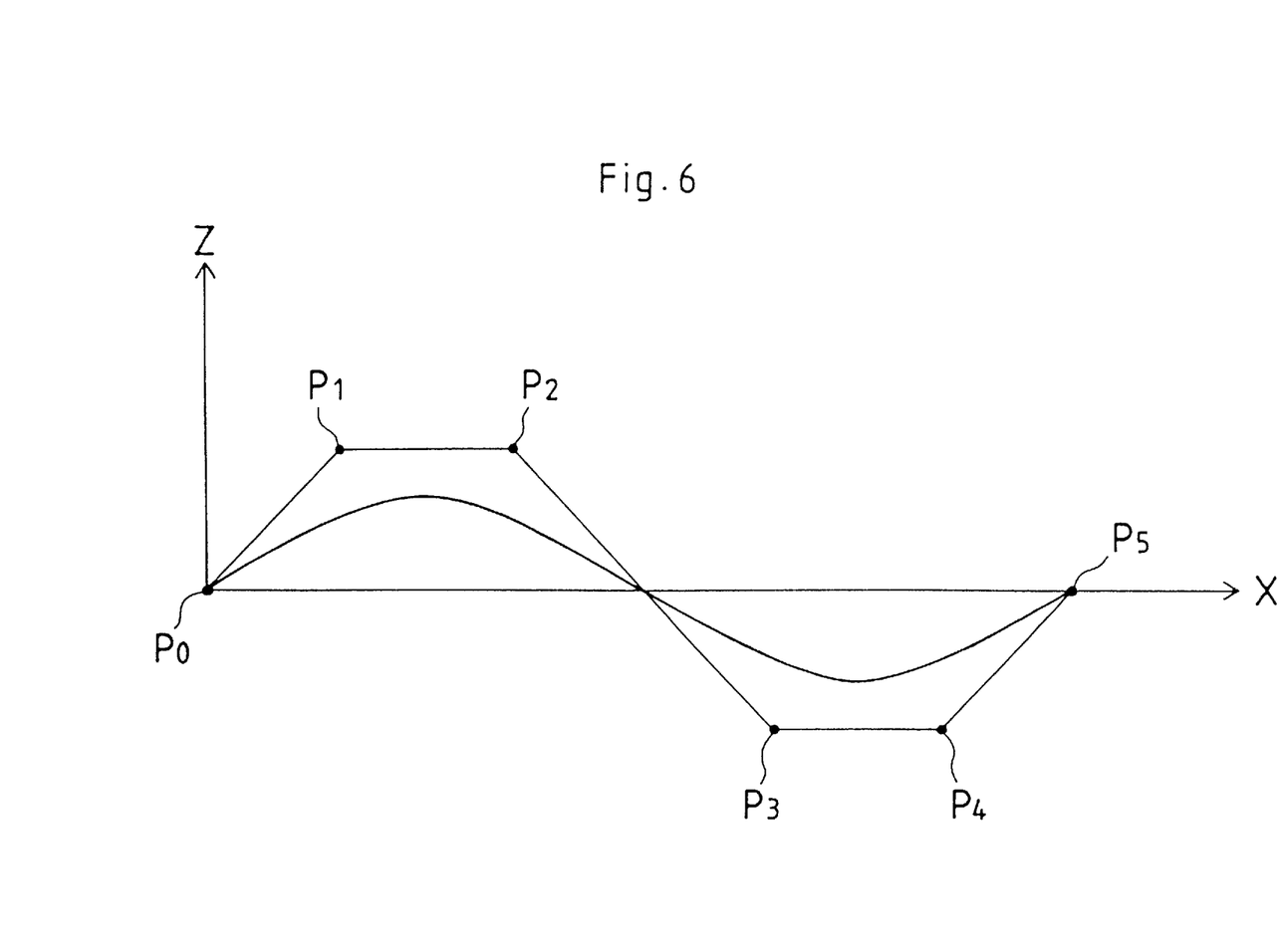
FIG. 6 is a diagram showing the relationship between control points and the NURBS curve.

FIG. 6 is a diagram showing the relationship between control points and the NURBS curve. This diagram shows a NURBS curve interpolated according to the first NURBS curve interpolation start command of NC programs shown in FIG. 5. Further, in the diagram, the first through sixth control points are represented by $P_0$ through $P_5$, respectively. In this manner, a smooth curved line is formed in accordance with positions of respective control points.

Figure 7:
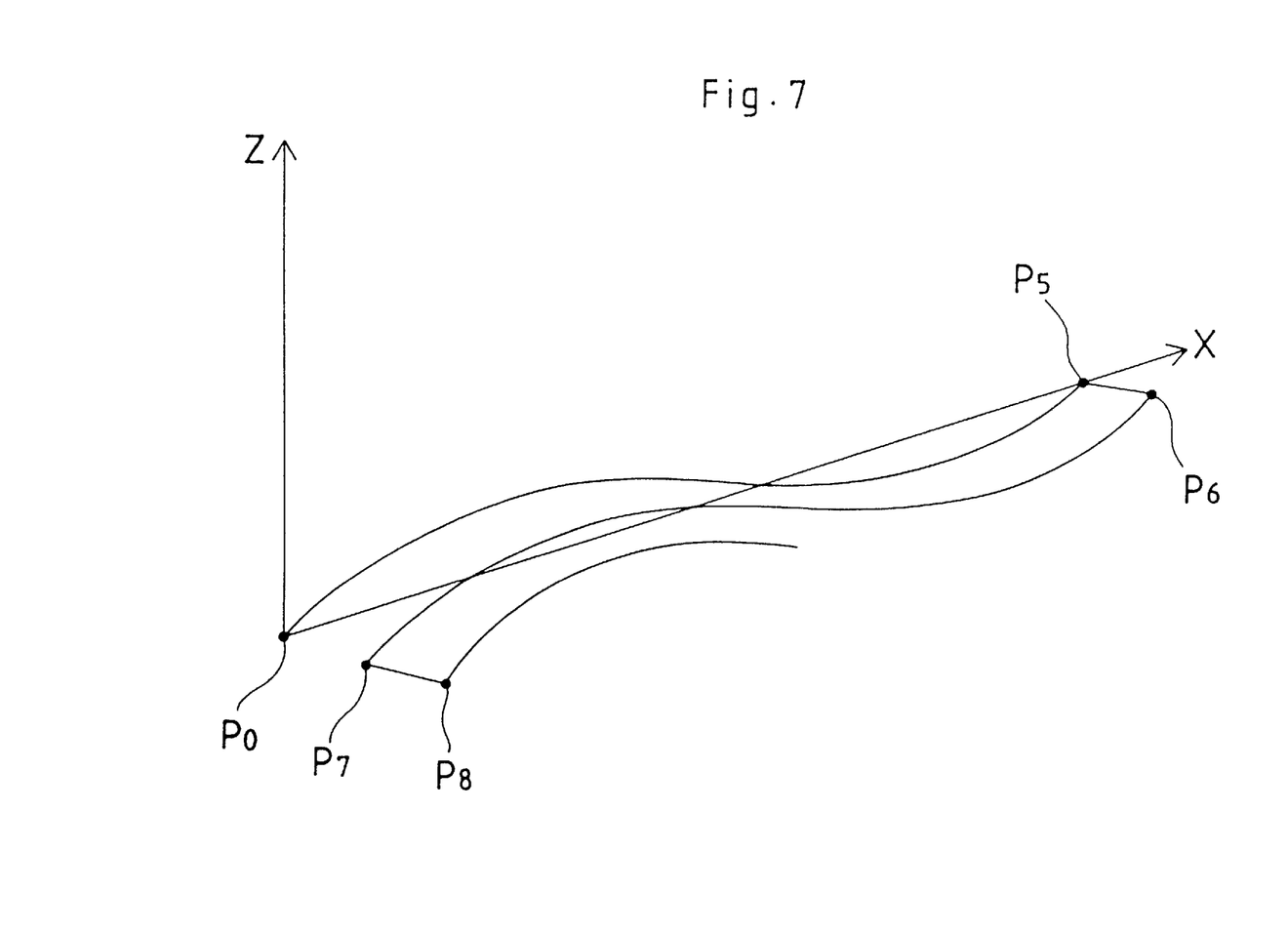
FIG. 7 is a diagram showing an interpolation path drawn according to the NC programs shown in FIG. 5.

FIG. 7 is a diagram showing an interpolation path according to NC programs shown in FIG. 5. According to the first NURBS curve interpolation start command, the interpolation from the first control point $P_0$ to the sixth control point $P_5$ is executed. Then, the linear interpolation to the control point $P_6$ is executed, and thereafter, the interpolation from the seventh control point $P_6$ to the twelfth control point $P_7$ is executed according to the next NURBS curve interpolation start command. Further, the interpolation to the thirteenth control point $P_8$ which is the next NURBS curve interpolation start position is executed, and subsequently, an interpolation is executed likewise.

As described above, the NURBS curve interpolation can be instructed to the CNC by specifying the smallest volume of data necessary for identifying a profile of the NURBS curve. Therefore, there is no need for dividing a free-form curve represented by the NURBS curve into small straight lines, small circular arcs, etc., as is necessary in the case of the prior art, so that NC programs can be simplified. Thus, NC programs are simplified to reduce the amount of the data, so that data transmission between the host computer and the CNC can be performed at a high speed. In addition, NC program analysis processing in the CNC can also be performed at a higher speed.

Moreover, in determining the interpolation path of a free-form curve, there is no need for executing an approximation calculation, so that machining accuracy can be improved.

We claim:

1. A free-form curve interpolation method, comprising the steps of:

(1) recognizing a NURBS (Non-Uniform Rational B-Spline) curve interpolation command included in a NC Program:

(2) calculating a distance to move during an interpolation period on the basis of a feed rate command in said recognized interpolation command;

(3) calculating a change in a parameter brought on when moving by the distance calculated in said step (2) from a current position specified by a current parameter value;

(4) calculating a position to be specified by a parameter which is obtained by adding the amount of the change of the parameter calculated in said step (3) to the current parameter of said step (3), on the basis of a defining formula of said NURBS curve;

(5) calculating a movement amount of each axis for moving to said position calculated in said step (4), and then outputting an interpolation pulse to each axis; and (6) repeating said step (3) using said position of said step (4) as said current parameter value.

2. A free-form curve interpolation method, comprising the steps of:

(1) designing a workpiece by representing a free-from curve with a NURBS curve using a CAD system;

(2) creating a NC program by a CAM system with a format capable of instructing the interpolation of said NURBS curve to a CNC;

(3) inputting said created NC programs to said CNC, whereupon said CNC executes the steps of:

(3–1) recognizing a NURBS curve interpolation start command;

(3–2) calculating a distance to move during interpolation period, on the basis of a speed (feed rate) command of said NC program;

(3–3) calculating a change in a parameter for moving by the distance calculated in said step (3–2) from a current position specified by a value of said parameter used as a function expressing said NURBS curve;

(3–4) calculating a position specified by substituting a parameter obtained by adding the parameter value calculated in said step (3–3) to the calculated change of parameter, for said function expressing said NURBS curve, as a point to be interpolated next, so as to obtain the next position on said NURBS curve separating from said current position along said NURBS curve by the distance calculated in said step (3–2); and (3–5) calculating a movement amount of each axis from said current position to said next position, and outputting interpolation pulses corresponding to said calculated movement amount to each axis driving control circuit, thereby executing an interpolation on a path along said NURBS curve.

3. A free-form curve interpolation system for a numerical control unit which controls axis movement of various machine tools, comprising:

preprocessing calculation unit for reading NC programs including an interpolation command of a NURBS curve expressed by a function using a specific parameter as a variable, calculating a movement amount per unit time on the basis of a feed rate command in the interpolation command of the NURBS curve and outputting a movement command;

parameter change calculation unit for calculating a change in said parameter brought on when moving by said movement amount; and movement amount calculation unit for obtaining a coordinate value to be interpolated next by substituting a value which is obtained by adding the value of said parameter change to a current value of said parameter, for a function expressing said NURBS curve, so as to calculate a movement amount of each axis corresponding to said coordinate values.

4. The free-form curve interpolation system according to claim 3, wherein said preprocessing calculation unit recognizes a NURBS curve to be interpolated when data is transmitted by said NC program, said data comprising:

a plurality of control points;

a plurality of weights whose number is equal to the number of said control points; and a knot whose value is equal to the sum of a rank of a curve and the number of said control points.

5. The free-form curve interpolation system according to claim 3, wherein said preprocessing calculation unit recognizes a weight as a predetermined arbitrary value if said weight is omitted.

* * * * *

UNITED STATES PATENT AND TRADEMARK OFFICE
CERTIFICATE OF CORRECTION

PATENT NO. : 5,815,401

DATED : September 29, 1998

INVENTOR(S) : Otsuki et al.

It is certified that error appears in the above-identified patent and that said Letters Patent is hereby corrected as shown below:

Col. 3, line 60, equation (1), both occurrences, "$\sum_{i=0}^{n}$" should be -- $\sum i=0^n$ --.

Col. 4, line 63, "$|<'(t)>|$" should be -- $|<P'(t)>|$ --.

Col. 5, line 42, " " should be --"0"--.

Signed and Sealed this

Ninth Day of March, 1999

Attest:

Q. TODD DICKINSON

Attesting Officer

Acting Commissioner of Patents and Trademarks